United States Patent [19]

Ogawa et al.

[11] 4,063,908

[45] Dec. 20, 1977

[54] PROCESS FOR MANUFACTURING CERAMIC CUTTING TOOL MATERIALS

[75] Inventors: Kazuki Ogawa; Michito Miyahara; Mitsuhiko Furukawa, all of Fukuoka, Japan

[73] Assignee: Nippon Tungsten Co., Ltd., Fukuoka, Japan

[21] Appl. No.: 650,831

[22] Filed: Jan. 21, 1976

[51] Int. Cl.$^2$ ............................................. C04B 35/56
[52] U.S. Cl. ................................. 51/307; 51/309 R; 51/309 A; 106/43; 106/73.33
[58] Field of Search ................. 106/43, 73.33; 51/307, 51/309

[56] References Cited

U.S. PATENT DOCUMENTS

| | | | |
|---|---|---|---|
| 2,768,266 | 10/1956 | Marsden, Jr. ........................... | 105/43 |
| 2,849,305 | 8/1958 | Frost ........................................ | 106/43 |
| 3,580,708 | 5/1971 | Ogawa et al. ........................... | 51/309 |
| 3,776,706 | 12/1973 | Daniels et al. ........................... | 106/43 |
| 3,886,254 | 5/1975 | Tanaka et al. ........................... | 51/309 |

Primary Examiner—Winston A. Douglas
Assistant Examiner—Mark Bell
Attorney, Agent, or Firm—Frank J. Jordan

[57] ABSTRACT

Sintering of a mixture of alumina and titanium carbide has been difficult heretofore, but by the intermediary action of titanium oxides, sintering of a powder mixture consisting of alumina and titanium carbide by hot-pressing at a comparatively lower temperature than that used in conventional processes becomes possible. Various procedures in which the above principle is applied, the powder mixture to be used therein and the materials produced thereby which are to be used for manuacturing cutting tools are disclosed.

4 Claims, 4 Drawing Figures

PROCESS FOR MANUFACTURING CERAMIC CUTTING TOOL MATERIALS

BACKGROUND OF THE INVENTION

This invention relates to an improvement in a process for manufacturing the material for ceramic cutting tools, and more specifically, to the powder mixture which is used in the process, and to the ceramic cutting tool materials prepared according to this process.

Properly speaking, in an evaluation of the properties of ceramic cutting tool materials, the following physical and mechanical properties are necessary.

Those properties are superior hardness with sufficient toughness at ordinary temperatures which is retained even during the superheated state of the cutting operation thereby resulting in superior resistance to abrasion and wear, and greater mechanical strength such as bending rupture strength and compressive strength which will minimize chipping or fractures. Furthermore, less affinity between cutting tool material and the metal to be cut is also required.

Other than the above requirements, one of more importance for ceramic cutting tool materials is thermal shock resistance which will minimize heat cracks caused by sudden heating and cooling. This property is especially necessary to eliminate failures due to the cracks which might arise by repeated heating and cooling of the edge of a knife blade during an intermittent cutting operation.

For the purpose of improving the various properties described above, a procedure employing titanium carbide as a constituent incorporated in a powder mixture consisting principally of alumina which is sintered by hot-pressing has been devised heretofore. A feature of an embodiment of the previous process which comprises mixing 15-80% of powdered titanium carbide by weight with powdered alumina, incorporating the thus produced mixture in a graphite mold and sintering by hot-pressing at pressures of about 400kg/cm$^2$ and temperatures of 1500°-1800° C has been advocated.

However, to some extent this method necessitates employing alumina of high purity as well as very fine particle size which has an improved sinterability as compared to that of the prior art. Therefore it was very hard to obtain a sintered body having a high density when using commercial alumina as the raw material in an ordinary process.

Furthermore, since sinterability of the above described powdered mixture is also dependent upon the purity of powdered titanium carbides, obtaining a sintered body with a high relative density in excess of 98.5% was difficult unless optimal conditions were achieved for each operation during hot-pressing.

The reason why the sintered body should have a relative density greater than 98.5% is due to the fact that if the body has a density lower than the above percent, the cutting performance of the cutting tools made therefrom is extraordinarily low.

The present invention has been achieved with the intention of overcoming these defects described above and has not been contemplated or even romotely suggested by the prior art.

It is an object of the present invention to provide a process for producing material for manufacturing cutting tools which have improved physical and mechanical properties as compared to those of the prior art.

It is another object of the present invention to provide a powder mixture which is used in the manufacturing of the material described above and which has improved sinterability.

It is still a further object of the present invention to provide novel ceramic cutting tool materials which have improved hardness and mechanical strength as compared to the prior art.

DETAILED DESCRIPTION OF THE INVENTION

Figure 1:
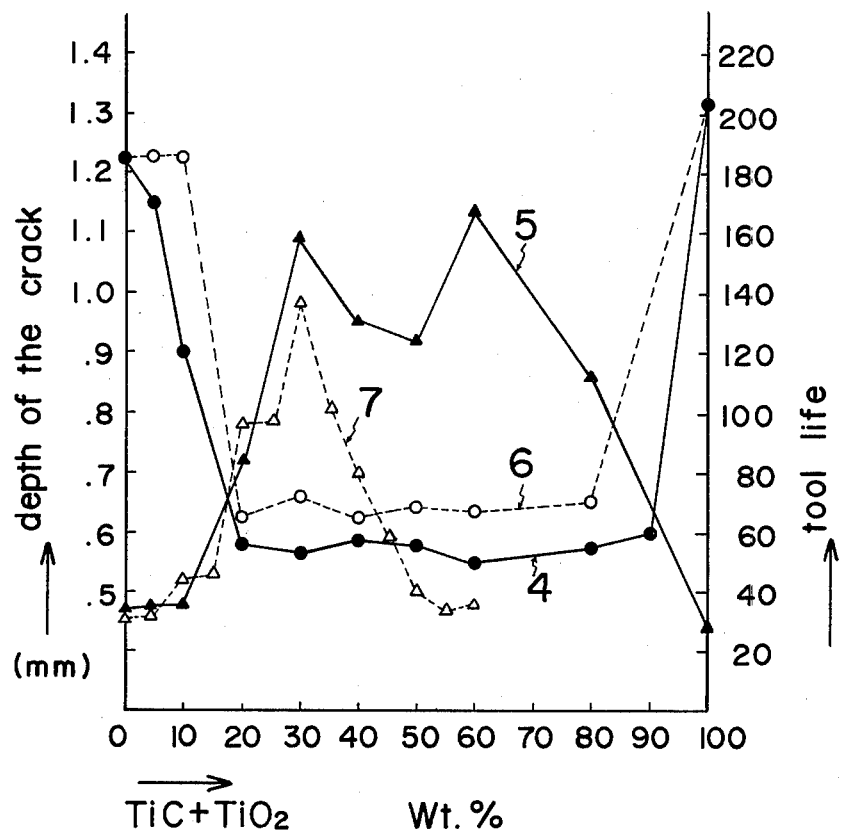
FIG. 1 is a diagram which shows the effect of the combined content of titanium carbide and titania on the physical and mechanical properties of the material manufactured according to the present invention. In this diagram, the left ordinate shows the depth of heat cracks expressed in mm. The right ordinate shows the tool life expressed by the number of the cut projections. While the abscissa is the content of titanium carbide plus titania expressed in percent by weight.

The concept of the process of the present invention comprises the incorporation of a limited quantity of titanium oxide as titania into a powder mixture of alumina and titanium carbide and sintering the mixture by hot-pressing wherein the sinterability of the mixture is improved and hence physical and mechanical strength of the produced materials are enhanced.

Briefly, the present invention includes the concept of providing powder mixtures which are to be used in manufacturing ceramic cutting tool materials containing 19-70% powdered titanium carbide by weight, 1-10% powdered titania by weight and the remainder powdered alumina, the process for manufacturing the material wherein the improvement comprises using the above mentioned powder mixture and the material manufactured therefrom.

In addition to the above constituents a suitable amount of conventional grain growth inhibitor such as magnesia or chromium oxide may be optionally added to the above described powder mixture to prevent grain growth in the sintering body.

Hereinafter the compositions in this specification will be expressed in terms of % by weight unless otherwise noted.

In this specification, titanium oxide usually refers to titanium dioxide although titanium monoxide and dititanium trioxide may be optionally included therewith. All oxides can be used without any substantial difference in this invention and in this invention titania refers to titanium dioxide.

In its detailed aspect, the present invention involves the process for manufacturing materials to be used for ceramic cutting tools which embraces the following embodiments.

FIRST EMBODIMENT (1st Step)

A homogeneous mixture was formed by thoroughly blending 10% powdered titania and 90% powdered titanium carbide. Eleven batches of mixtures were constituted by mixing consecutively increasing amounts of the above mentioned mixture, i.e., 0,5,10,20,30,40,50,60,80,90,100 parts respectively with correspondingly decreasing amounts of powdered alumina, i.e., 100,95,90,80,70,60,50,40,20,10,0 parts respectively. As a control, the mixtures of the prior art had consecutively varying contents of only titanium carbide and alumina without titania and were constituted similarly to those described above.

(2nd Step)

Various batches of the mixtures were hot-pressed in a graphite mold with inside measurements of $13 \times 13 \times 5$mm at a temperature of 1500°-1700° C and at a pressure of 200kg/cm$^2$ to form test pieces of the present invention and the control of the prior art.

(3rd Step)

As an evaluation of mechanical properties, the crack test and the tool life test (the fatigue life test) were conducted on the above mentioned test pieces. In conducting the crack test, the pieces were heated at 230° C for 30 minutes, and immediately cooled with water at 22° C. The depth of the crack which occurred thereby was then measured.

In conducting the tool life test, the conditions were as follows:

| | |
|---|---|
| radius of knife edge of the specimen | 0.8R |
| metal to be cut | gray cast iron having hardness of H B 201 and tensile strength of 20kg/cm$^2$ |
| cutting speed | 200m/min |
| feed | 0.32mm/rev. |
| depth of cut | 2.0mm |

Figure 2:
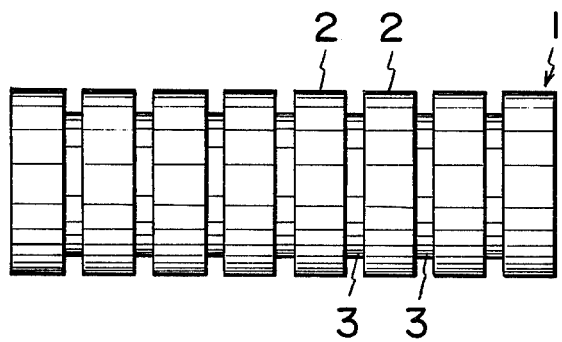
FIG. 2 indicates the shape of a work piece which was cut in the tests of FIG. 1 and is shown as a longitudinal sectional view.

The shape of the work piece 1 cut was one as indicated in FIG. 2. A plural number of parallel grooves 3 of 5mm in width were cut into the periphery of a gray cast iron test cylinder of 250mm in diameter. An interval of 20mm in width 2 was left uncut between the grooves. To test the performance of the ceramic cutting tools, the disc like projections, that is, the intervals of 20mm in width were severed from the test cylinder at the grooves. The tool life was evaluated as the number of disc like projections which could be successfully severed before the tool showed 0.2m of frank wear or before the tip was fractured.

The results of this experiment using test pieces of this invention and those of the prior art are shown in the diagram of FIG. 1 in which the left ordinate is the depth of cracks caused by heating and sudden cooling expressed in mm and the right ordinate is the tool life expressed by the number of the cut projections. The abscissa is the content of titanium carbide plus titania expressed in percent by weight. Curves 4 and 5 respectively indicate the variations in the depth of heat cracks and the tool life of each of the test pieces of this invention. Curves 6 and 7 indicate the variation in the depth of heat cracks and the tool life of each of the test pieces of the prior art.

As shown in the above results, if the total amount of titanium carbide plus titania in the homogeneous alumina, titania, titanium carbide mixture was less than 20%, the depth of the cracks in the test pieces was great and the tool life was short. If the tool amount was above 80%, the tool life was also decreased. From the above results, for this invention the amount of the titanium carbide, titania and the total amounts of both compounds are set at 19-70%, 1-10% and 20-80% respectively while the remainder is alumina. The reason for the tendency toward cracking and shorter tool life may be due to the fact that if the amount of alumina or the total amount of titaniun carbide plus titania is extreme, the drawbacks of alumina and both titanium compounds will be revealed.

The relative density of all test pieces used in the experiment of FIG. 1 was greater than 99.5%.

Furthermore, the reason that the amount of titanium oxide is set at 1-10%, is due to the fact that if the amount of titanium oxide is less than 1%, the action and effect of titanium oxide being included in the complex is not sufficiently manifested and any improvement in the sinterability of the powder mixture of the present invention can not be expected. However, if the amount of titanium oxides is above 10%, it is apt to react with the graphite mold during sintering and will cause a crack due to adhesion to the mold. In addition to this, considerable carbon monoxide or carbon dioxide gas evolution occurs, which remains partly in the material body and has a deleterious effect on the sintering of the material resulting in the failure to produce a material of high density.

The temperature in hot-pressing was regulated within the range from 1500° C to 1700° C. Substantial improvement with regard to the sinterablility of the powder mixture was observed by the inclusion of titanium oxides at temperatures above 1500° C. If the temperature was elevated above 1700° C, any significant improvement in the sinterability caused by the elevation of temperature could not be observed and worse, the growth of grains in the sintered body was enhanced by such as elevation of temperature affecting the sintered body and its texture adversely.

SECOND EMBODIMENT (1st Step)

The surface of the particles of powdered titanium carbide are partially oxidized to an extent such that the oxygen content of the particles becomes several percent.

(2nd Step)

The thus oxidized titanium carbide having been partially converted to titanium oxides is mixed with powdered alumina so that the whole composition may consist of 19-70% titanium carbide, 1-10% titanium oxide and the remainder being alumina. The mixture is blended thoroughly to obtain a homogeneous powder.

(3rd Step)

The thus obtained powder mixture is sintered by hot-pressing in a graphite mold at a temperature of 1500°-1700° C and at a pressure of 200kg/cm$^2$.

In the first step, the exterior surface of the particles of titanium carbide powders is oxidized at least partially to titanium oxide with each particle being oxidized to a uniform extent so that a thin layer of the oxide is formed on the outside.

The titanium carbide and titanium oxide thus produced form a solid solution binding strongly to each other. In the sintering by hot-pressing of the powder mixture containing alumina and the above mentioned partially oxidized titanium carbide, titanium oxides will be consecutively reduced to lower oxides according to the following reactions and finally most of the existing titanium oxide will change into titanium carbide.

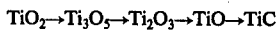

In some cases, a small portion may remain as the oxide, but a sintered body which has the composition of 19.7–79.4% titanium carbide by weight with the remainder being substantially alumina can be produced in the end.

However, in the intermediate steps of these reactions, titanium oxides bind strongly to alumina to form an intermediary complex and alumina binds strongly to titanium carbide even after the oxides are converted to titanium carbide and hence, it is possible to sinter the powdered mixture according to this invention at a comparatively lower temperature than that used in conventional procedures. Alumina and titanium carbide without the addition of titania neither form a solid solution nor bind together. Hence powder mixtures of these compounds can not be readily sintered.

THIRD EMBODIMENT (1st Step)

As a preliminary treatment, powdered titania is partially carburized by conventional methods to form a solid solution of titanium oxide and titanium carbide.

(2nd Step)

A quantity of the thus treated powder mixture is mixed with powdered alumina so that the resultant mixture may have a composition consisting of 19–70% titanium carbide, 1–10% titanium oxide with the balance being alumina. This mixture is thoroughly blended.

(3rd Step)

The powder mixture thus obtained is sintered by hot-pressing in a graphite mold at a temperature of 1500°–1700° C and at a pressure of 200kg/cm².

A suitable amount of magnesia which has an inhibitory effect upon grain growth may be optionally incorporated into the above mentioned mixtures of the second and third embodiments.

In the first step, the exterior surface of particles of powdered titanium is carburized at least partially to titanium carbide with each particle being carburized to a uniform extent. (Titanium carbide will exist to a greater extent, with a thin layer of the carbide formed on the outside diffusing into the center portion of the particles, in some cases.)

Titanium oxides and the thus produced titanium carbide form a solid solution and bind strongly to each other.

In sintering by hot-pressing of the powder mixture containing alumina and the above mentioned partially carburized titania, titanium oxides will be reduced to lower oxides, and in the end according to this process most of titanium oxides will be converted to titanium carbide. By utilizing the intervening titanium oxides which bind to both alumina and titanium carbide, an intermediary complex is formed. That is, by the intermediary action of titanium oxide, alumina and titanium carbide bind strongly to each other to form a strong as well as a densely sintered body, which is to be used for manufacturing ceramic cutting tools. Therefore, by the intervention of the titanium oxides between alumina and titanium carbide, both alumina and titanium carbide bind to the titanium oxides to form the complex TiC-Ti$_x$O$_y$ as well as the complex Ti$_x$O$_y$-Al$_2$O$_3$. These resultant complexes bind strongly to each other through the intermediary action of the titanium oxides. This is the concept on which this invention is based.

Accordingly, a superior sintered body having a relative density of greater than 98.5% can be obtained without a crucial consideration of the purity of the alumina or the titanium carbide. Commercially available powdered alumina and titanium carbide are employable in this invention, and a material for ceramic cutting tools with high cutting performance can be obtained therefrom.

As can be understood from the description, by carrying out this invention the various following excellent results will be obtained.

1. By incorporating a limited amount of titania in the powder mixture which consists of alumina and titanium carbide, titanium oxides combine with alumina as well as titanium carbide to form a strongly bound intermediary complex. This binding force will continue undiminished even after the oxide has been converted to titanium carbide according to the following sequence of reactions:

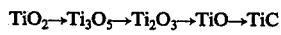

Therefore sintering at a comparatively lower temperature than that used in conventional processes is possible. The resultant material will have improved physical and mechanical strength and especially a thermal shock resistance to a degree which has been unobtainable heretofore, but can be obtained according to this invention as is shown by the data of FIG. 1.

Figure 3:
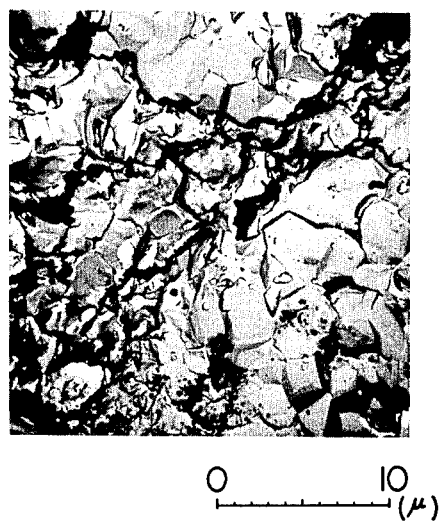
FIG. 3 is an electron photomicrograph at ×3000 magnification of the structure of a sintered body of the control material produced from the powder mixture consisting of alumina 70% by weight and titanium carbide 30% by weight containing no titanium oxide.
Figure 4:
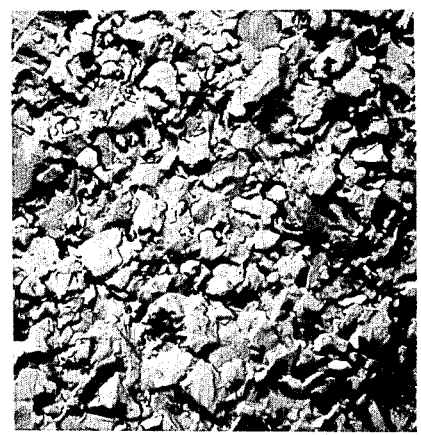
FIG. 4 is an electron photomicrograph of a sintered body of the material produced from the powder mixture consisting of alumina 70% by weight, titanium carbide 26% by weight and titania 4% by weight in accordance with the present invention. Both sintered bodies have been prepared by hot-pressing.

2. Sintering by hot-pressing at a comparatively lower temperature than that used in conventional processes is possible by using the aforesaid powder mixture and the materials, i.e., the sintered bodies, obtained thereby have a dense, fine structure as is shown in the photomicrograph of FIG. 4 as compared to that of FIG. 3, a photomicrograph of the prior art.

According to the present invention, excellent ceramic cutting tools having high strength as well as great thermal shock resistance can be obtained from the material according to this invention.

3. It is not necessary to examine the various characteristics of the raw materials and commercially available powdered alumina and powdered titania are employable according to this invention.

4. Every grade of titanium carbide, from the pure chemical to the cheap lower grade material which contains much oxygen can be used according to the various procedures of this invention.

However, the step of incomplete oxidizing or carburizing the surface of the particles of respective powdered titanium carbide or titania until the content of oxygen in the powder becomes several percent is necessary in order to regulate the content of titanium oxide in the entire powder mixture which is used in hot-pressing and also for increasing the efficiency of the operation. This surface oxidation or carburizing is conducted either by means of conventional physical or chemical procedures with the object being to form a uniformly thin layer of titanium oxides or titanium carbide on the surface of the respective powdered titanium carbide particle or titanium oxides particle. A complete understanding of the invention may be obtained from the consideration of the following examples.

EXAMPLE 1

(simple mixing procedure)

89.8% of a powder of commercial alumina with a purity of above 99.5% and mean particle size of 1 μ was mixed with 10% of powdered titania and 0.2% of magnesia and the mixture was subsequently thoroughly blended. Then the thus prepared mixture was preliminarily roasted at a temperature of 1300° C for 2 hours.

A 100g portion of commercial powdered titanium carbide with a total carbon content of 19.1% and a mean particle size of 2 μ was mixed with 100g of the above mentioned powder mixture. The whole mixture was ball milled wet to grind and blend to obtain a homogeneous composition. Then the ball-milled charge was dried and was compacted in a graphite mold of 50 × 50 × 5.5mm, placed in a high frequency coil furnace and hot-pressed at a temperature of 1600° C and a pressure of 200kg/cm² for 60 minutes. Finally the pressure was released and the mixture was cooled. The thus sintered body measuring 50 × 50 × 5.5mm obtained thereby was cut with a diamond blade into small test pieces which were then ground with a diamond faced grinding wheel yielding four small sectional test pieces measuring 24 × 8 × 5mm. These test pieces were tested for the following physical and mechanical properties:

| | |
|---|---|
| relative density (specific gravity to the theoretical specific gravity) | 99.2% |
| hardness HrA | 94.3 |
| bending rupture strength | 78.5kg/mm² |

EXAMPLE 2

(modified procedure using partially carburized titania)

A 140g portion of commercial powdered alumina having a mean particle size of 1 μ and a purity of above 99.5% was mixed with 60g of partially carburized titania powder which had been prepared by partially carburizing commercial powdered titania of a purity greater than 99% and which had a combined carbon content of 16%, an oxygen content of 4.2% and a mean particle size of 1.5 μ.

The resultant mixture was blended thoroughly and sintered by hot-pressing as in Example 1 to yield sintered bodies from which test pieces were prepared and were subjected to examination. The following evaluation values were obtained:

| | |
|---|---|
| relative density (specific gravity to the theoretical specific gravity) | 98.7% |
| hardness HrA | 94.4 |
| bending rupture strength | 77.0kg/mm² |

EXAMPLE 3

(modified procedure using partially oxidized titanium carbide)

A 140g portion of the same commercial powdered alumina as used in Example 2 was mixed with 60g of a partially oxidized titanium carbide powder which had been previously prepared by partially chemically oxidizing the same commercial titanium carbide powder as in Example 1 using an aqueous solution of hydrogen peroxide to an extent sufficient to result in an oxygen content of 4% in the partially oxidized titanium carbide powder. Then the mixture was thoroughly blended and sintered by hot-pressing as in Example 1 to yield sintered bodies. However, in this case the sintering temperature was 1580° C.

Test pieces were prepared and the evaluation of the experiment was conducted as indicated in Example 1; the following values were obtained:

| | |
|---|---|
| relative density (specific gravity to the theoretical density) | 99.7% |
| hardness HrA | 94.4 |
| bending rupture strength | 79.3kg/mm² |

EXAMPLE 4

Using the same commercial powdered alumina and titanium carbide as indicated in Example 1 along with titania powder of a particle size less than 1 μ, the following two different formulations of powdered mixture were prepared.

| | |
|---|---|
| sample No. 1: | alumina : titanium carbide : titania = 140g : 58g : 2g = 70% : 29% : 1% |
| sample No. 2: | alumina : titanium carbide : titania = 140g : 52g : 8g = 70% : 26% : 4% |

The above mentioned two respective powdered mixtures were thoroughly blended and sintered by hot-pressing; then test pieces were prepared as in Example 1, were evaluated and the following results were obtained.

| sample | No.1 | No.2 |
|---|---|---|
| relative density (specific gravity to the theoretical specific gravity) (%) | 98.90 | 100.00 |
| hardness (HrA) | 94.0 | 94.4 |
| bending rupture strength (kg/mm²) | 68.0 | 75.25 |

In addition to the preceding data, the following evaluation data were obtained upon the testing of various formulations wherein the amount of titanium carbide and titania were varied. The same procedures of blending and sintering by hot-pressing as indicated in the above examples were followed.

Table 1

| | composition of the employed powder mixture | | | conditions of hot-pressing | | | physical & mechanical properties of the yielded material | | |
|---|---|---|---|---|---|---|---|---|---|
| Lot No. | alumina | titanium carbide | titania | temperature (° C) | pressure (kg/cm²) | time (min.) | relative density (%) | hardness (HrA) | Bending rupture strength (kg/mm²) |
| 1 | 70 | 30 | 0 | 1620 | 200 | 60 | 98.2 | 92.7 | 69.0 |

Table 1-continued

| Lot No. | composition of the employed powder mixture titanium alumina:carbide:titania | conditions of hot-pressing | | | physical & mechanical properties of the yielded material | | |
|---|---|---|---|---|---|---|---|
| | | temperature (° C) | pressure (kg/cm²) | time (min.) | relative density (%) | hardness (HRA) | Bending rupture strength (kg/mm²) |
| 2 | 70 30 0 | 1720 | 200 | 60 | 99.0 | 93.2 | 62.8 |
| 3 | 70 29 1 | 1600 | 200 | 60 | 98.9 | 94.0 | 68.0 |
| 4 | 70 28 2 | 1600 | 200 | 60 | 99.4 | 94.2 | 75.5 |
| 5 | 70 26 4 | 1600 | 200 | 60 | 100 | 94.4 | 80.3 |
| 6 | 70 24 6 | 1560 | 200 | 60 | 100 | 94.4 | 73.5 |
| 7 | 70 20 10 | 1560 | 200 | 60 | 98.8 | 94.1 | 55.0 |

As can be understood from Table 1, the powder mixture of the materials of this invention should contain 4% by weight of titania for best results. The cutting performance of the materials increases with a higher relative density. The materials which were prepared according to this invention showed better cutting performance under practical conditions when the relative density was higher than 98.5%.

In the case where titania is excluded from the formulation, either the procedure of Example 3 must be used or the temperature of hot-pressing must be maintained above 1700° C.

By incorporating titania in amounts of 1% of more into the powder mixture of the present invention, materials with a relative density of greater than 98.5% can be prepared therefrom. However, if the content of titania is increased to greater than 10%, the bending rupture strength of the material decreases markedly.

Furthermore, by the same procedure as that of Example 1, another experiment was carried out in which the content of titania was maintained at 4% and that of titanium carbide was increased progressively, while the amount of alumina was progressively and correspondingly decreased. The results are summarized in Table 2.

Table 2

| Lot No. | composition of the employed powder mixture titanium alumina:carbide:titania | conditions of hot-pressing | | | physical & mechanical properties of the yielded material | | |
|---|---|---|---|---|---|---|---|
| | | temperature (° C) | pressure (kg/cm²) | time (min.) | relative density (%) | hardness (HRA) | bending rupture strength (kg/mm²) |
| 8 | 80 16 4 | 1500 | 200 | 60 | 99.7 | 94.3 | 72.0 |
| 9 | 60 36 4 | 1550 | 200 | 60 | 100 | 94.5 | 87.5 |
| 10 | 40 56 4 | 1590 | 200 | 60 | 100 | 94.4 | 80.3 |
| 11 | 20 76 4 | 1590 | 200 | 60 | 99.0 | 94.1 | 75.5 |

The results of Table 2 confirm that with the incorporation of 4% titania sintering by hot-pressing can readily be accomplished and the physical and mechanical strength of Lot No. 9 in particular indicates a very high quality with a hardness of 94.5 and a bending rupture strength of 87.5kg/mm².

Still another experiment was conducted in which the amounts of titanium carbide and titania respectively were varied, and the results are enumerated in Table 3.

Table 3

| Lot No. | composition of the employed powder mixture titanium alumina:carbide:titania | conditions of hot-pressing | | | physical & mechanical properties of the yielded material | | |
|---|---|---|---|---|---|---|---|
| | | temperature (° C) | pressure (kg/cm²) | time (min.) | relative density (%) | hardness (HRA) | bending rupture strength (kg/mm²) |
| 12 | 90 7 3 | 1600 | 200 | 60 | 100 | 93.7 | 61.3 |
| 13 | 60 38 2 | 1550 | 200 | 60 | 100 | 94.3 | 78.5 |
| 14 | 50 40 10 | 1550 | 200 | 60 | 99.8 | 94.3 | 56.5 |
| 15 | 40 48 12 | 1500 | 200 | 60 | 99.1 | 94.2 | 53.0 |
| 16 | 30 60 10 | 1540 | 200 | 60 | 100 | 94.5 | 90.3 |
| 17 | 20 68 12 | 1550 | 200 | 60 | 100 | 94.4 | 79.0 |
| 18 | 10 75 15 | 1600 | 200 | 60 | 100 | 94.3 | 72.5 |

From the above Table 3, it can be understood that accompanying with an increase in the content of titanium carbide to an extent greater than 60%, the amount of titania to be added should be increased accordingly to more than 10%. As a result the hardness as well as the bending rupture strength of the yielded material can be increased.

What is claimed is:

1. A process for manufacturing ceramic cutting tool materials which comprises mixing and thoroughly blending titanium carbide powder, titania powder and alumina powder to form a powder mixture consisting of 19–70% titanium carbide by weight, 1–10% titania by weight and the remainder alumina and having greatly improved sinterability and hot-pressing the thus prepared mixture at a temperature of 1500°–1700° C to form a sintered body of the mixture having a fine, dense structure as well as high mechanical strength due to the intermedial action of titanium oxide which enhances the binding between alumina and titanium carbide.

2. A process for manufacturing the ceramic cutting tool materials according to claim 1 wherein said titanium carbide is at least a member selected from the group consisting of powdered titanium carbide, powdered titanium carbide of which the exterior surface of the particles is at least partially oxidized to form titanium oxide thereon, and powdered titania of which the exterior surface of the particles is at least partially carburized to form titanium carbide thereon.

3. A process for manufacturing the ceramic cutting tool materials according to claim 1 wherein said titania is at least a member selected from the group consisting of powdered titania, powdered titania of which the exterior surface of the particles is at least partially carburized to form titanium carbide thereon and powdered titanium carbide of which the exterior surface of the particles is at least partially oxidized to form titanium oxide thereon.

4. A process for manufacturing the ceramic cutting tool materials according to claim 1 wherein said powdered alumina and said powdered titania are preliminarly mixed, and the thus formed mixture is preliminarily roasted, to which said powdered titanium carbide is added, mixed and thoroughly blended to form said powder mixture.

* * * * *